UNITED STATES PATENT OFFICE.

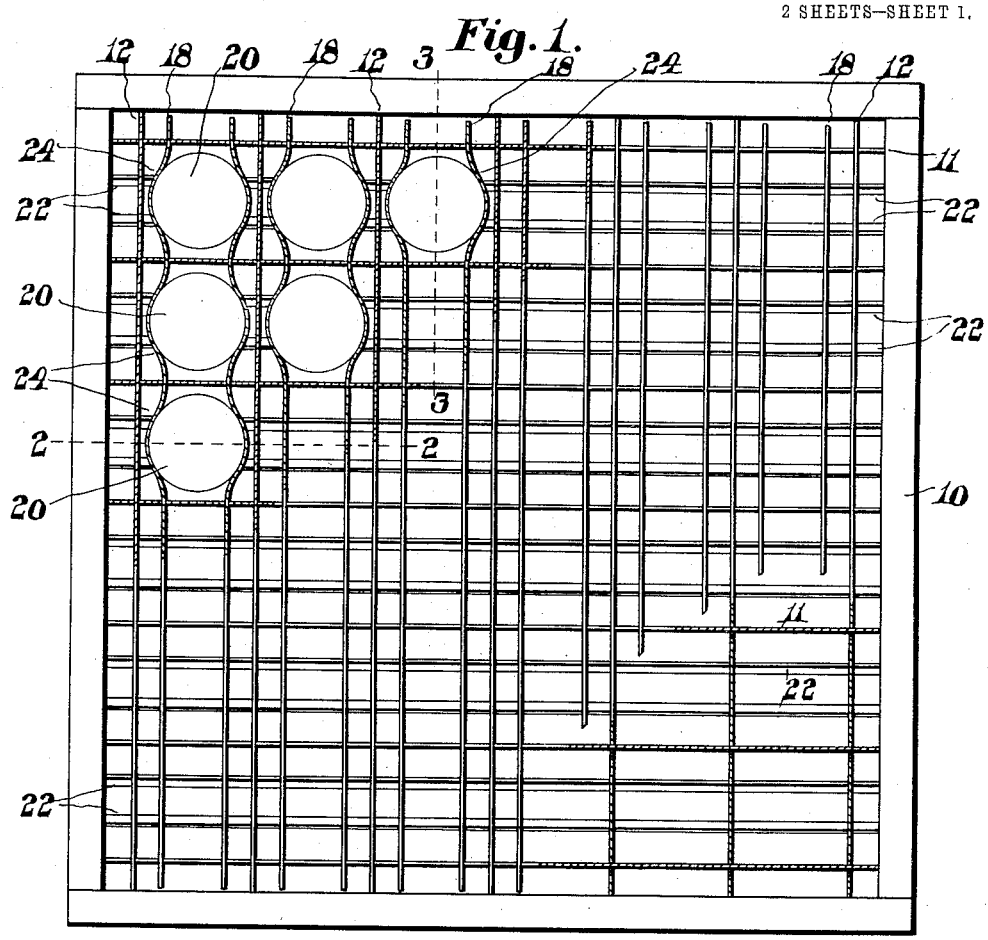
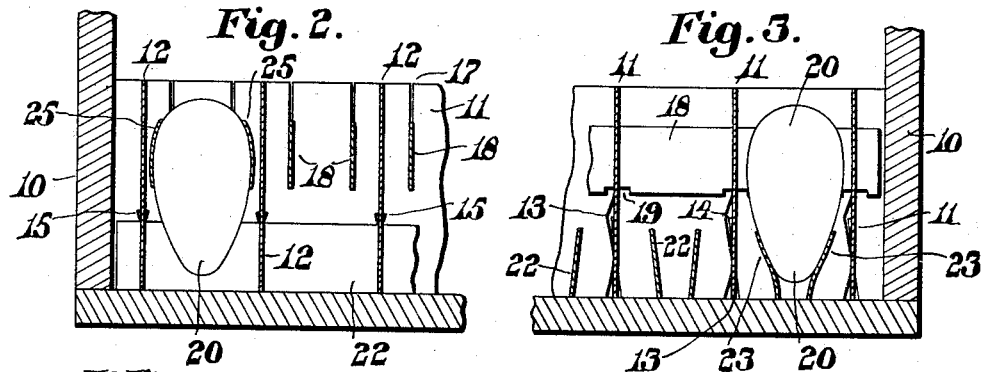

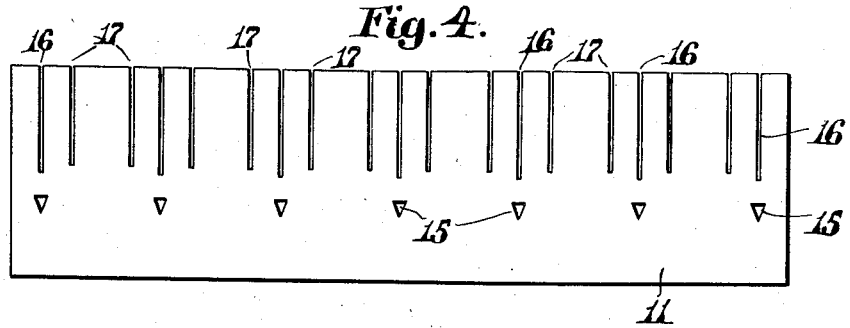
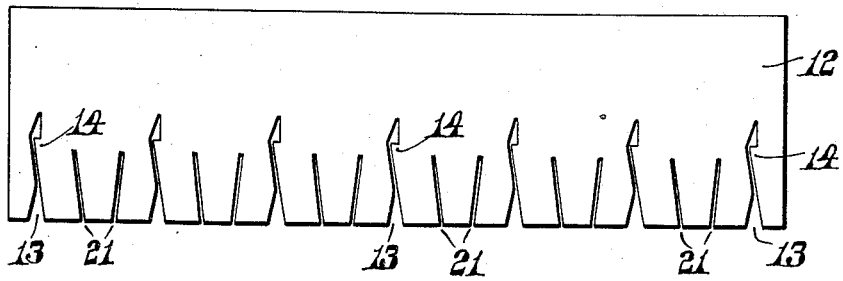
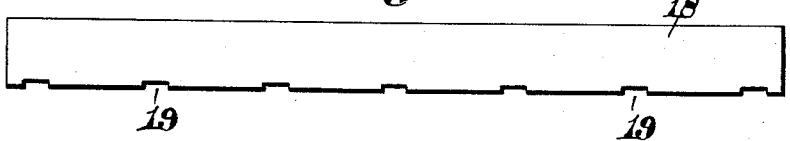
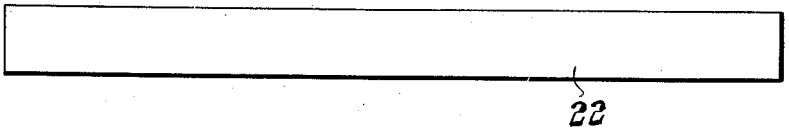
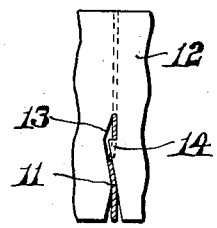

JOHN B. WARREN, OF BOLTON, MASSACHUSETTS, ASSIGNOR TO BROADFIELD POULTRY FARM, INCORPORATED, OF BOLTON, MASSACHUSETTS, A CORPORATION OF MASSACHUSETTS.

TRAY FOR EGG-CASES.

1,097,743.

Specification of Letters Patent.

Patented May 26, 1914.

Application filed January 13, 1913. Serial No. 741,879.

*To all whom it may concern:*

Be it known that I, JOHN B. WARREN, a citizen of the United States of America, and a resident of Bolton, in the county of Worcester and State of Massachusetts, have invented certain new and useful Improvements in Trays for Egg-Cases, of which the following is a specification.

The present invention relates to trays for egg cases or crates and has for its object the provision of a device of this class that, while collapsible, is so constructed that the eggs are centrally positioned in the various pockets, each egg being entirely removed from the walls of the pocket, thereby preventing injury to the eggs during transportation.

The invention consists in providing each egg receiving pocket with means extending across the pocket for retaining the egg suspended free from contact with either wall and immovable lengthwise of said pocket.

The invention further consists in certain novel features of construction and arrangement of parts which will be readily understood by reference to the description of the drawings and to the claims hereinafter given.

Of the drawings: Figure 1 represents a plan of an egg case containing a tray embodying the features of the present invention. Fig. 2 represents a partial vertical section of the same, the cutting plane being on line 2—2 on Fig. 1. Fig. 3 represents a partial vertical section of the same, the cutting plane being on line 3—3 on Fig. 1. Fig. 4 represents an elevation of one of the partition members. Fig. 5 represents an elevation of one of the other partitions. Fig. 6 represents an elevation of one of the yielding strips for positioning the larger end of the egg. Fig. 7 represents an elevation of one of the inclined strips for positioning the smaller end of the egg, and Fig. 8 represents a sectional detail showing the means for interlocking the two partition members.

Similar characters designate like parts throughout the several figures of the drawings.

In the drawings, 10 represents an egg case containing a tray composed of a plurality of parallel partition members 11 having interlocked therewith a plurality of other partition members 12, these partition members 11 and 12 being shown in elevation in Figs. 4 and 5 of the drawings, and are preferably constructed of pasteboard or some similar material. Each partition member 12 is provided with a plurality of peculiarly shaped slits 13 in the bottom edge thereof, each of these slits being so constructed as to form a projection 14 which is adapted to enter a perforation 15 in one of the partition members 11 to position and interlock the series of partition members 12 to the partitions 11 at right angles therewith. When the two series of partition members 11 and 12 are thus positioned and interlocked a plurality of egg receiving pockets is formed. It is obvious that when forming the tray the upper portions of the partitions 12 are positioned in the vertical slots 16 formed in the upper edge of the partition members 11. This construction of a tray forms no part of the present invention, it being an ordinary construction now in general use. The partitions 11 and 12 are, however, made somewhat wider than the partitions now in general use so that the walls of the pockets formed by the interlocking partition members 11 and 12 will extend beyond the ends of any egg positioned therein. The partition members 11 are provided also with additional slits 17 in the upper edges thereof, these slits or incisions 17 being adapted to receive a plurality of yielding strips 18. Two of these slits 17 are formed in each partition 11 intermediate each pair of slits or incisions 16, each slit 17 being located relative to a slit 16 adjacent thereto so that when the strips 18 have been inserted therein it would be impossible to bend said strip 18 sufficiently to extend to the partitions 12 located in said slits 16. Each of the strips 18 is provided in its lower edge with a plurality of notches 19, the inner edge of which contacts with the inner end of the slits 17. These notches assist in positioning the strips 18 while providing for slight endwise movement thereof when the eggs 20 are inserted in the egg receiving pockets of the tray between two of said strips 17. Intermediate the slits or incisions 13 formed in the lower portion of the strips 12 are two inclined slits 21 the lower ends of which are nearer together than the upper ends thereof as clearly indicated in Fig. 5 of the drawings. These slits 21 are adapted to receive the strips 22 shown in elevation in Fig. 7 of the drawings. The strips 18 and 22 are preferably made of paste board or some similar material. It is obvious that by inserting the strips 18 into the slits 17, in the partition members 11, and the strips 22 in the inclined slits 21 of the partition members 12, the said strips 18 and 22 are positioned at right angles to each other as clearly shown in Fig. 1 of the drawings. The separation of each pair of strips 22 is less than that of each pair of strips 18, the two series of strips extending across each egg receiving pocket at right angles to each other. When the egg is inserted in either of the egg receiving pockets the smaller end thereof is forced downwardly between the strips 22 slightly curving them outwardly as indicated at 23 in Fig. 3 of the drawings, the distance between the lower edges of the strips being less than the diameter of the smaller end of the eggs. The smaller end of the egg in this manner is positioned above the lower edge of the partitions 11 and 12 as shown in Figs. 2 and 3 of the drawings.

In introducing the eggs into the pockets the larger ends of the eggs are forced between the strips 18 curving them outwardly as indicated at 24 in Fig. 1 of the drawings. This lateral curvature 24 tends to prevent any movement of the egg 20 lengthwise of the strips 18 while it is self-evident that the strips 18 will prevent any movement of the egg at right angles to the length of said strips. These strips 18 also accommodate themselves vertically to the curvature of the larger end of the egg as indicated at 25 in Fig. 2 of the drawings, thus preventing any movement of the egg upwardly. The result is that when the egg 20 is forced into the end of the egg receiving pockets it is so held by the curvatures in the strips 18 and 22 that it will be suspended centrally of each pocket and removed from the walls thereof while any movement lengthwise of the egg in its pocket is absolutely prevented. By suspending eggs in this manner in each of the pockets by means of yielding members a case containing eggs may be handled very roughly in transportation without any danger of damaging the eggs in transit. The tray is so constructed that even with the additional strips 18 and 22 it may be collapsed in the same manner that the ordinary tray is collapsed before the additional strips have been added thereto.

Heretofore, where the eggs are packed in the ordinary cases a filling of yielding material is required at the bottom of each case, while a separating sheet of material is essential between the successive trays. This filling material and these separators are entirely unnecessary in connection with the present device for the simple reason that the eggs are all suspended centrally in the pockets and cannot move therein into contact with either wall thereof or be moved lengthwise of the pocket so that the ends of the eggs may contact with one another or with the top or bottom of the case. It is quite obvious that eggs may be safely transported to any distance in a case provided with trays of this construction.

It is believed that the many advantages of this invention will be fully apparent from the foregoing description.

Having thus described my invention, I claim:

1. In a device of the class described, the combination of a collapsible tray having a plurality of egg receiving pockets; and means within each pocket consisting of two pairs of flat parallel yielding strips extending across said pocket at right angles to each other and at different levels adapted to centrally position an egg free from contact with the walls thereof.

2. In a device of the class described, the combination of a collapsible tray having a plurality of egg receiving pockets; flat members at one end of said pockets adapted to conform to the shape of the larger end of said eggs thereby preventing end movement thereof and contact with the walls of said pockets; and means at the other end of said pockets for positioning the smaller end of the eggs.

3. In a device of the class described, the combination of a collapsible tray having a plurality of egg receiving pockets; yieldable flat members at one end of said pockets conforming to the shape of the larger end of said eggs and preventing the contact thereof with the walls of said pockets; and means consisting of a pair of flat members at the other end of said pockets for positioning the smaller end of the eggs both of said means combining to prevent end movement of said eggs.

4. In a device of the class described, the combination with a tray having a plurality of rows of egg receiving pockets; two parallel yielding flat strips extending across one end of each row of pockets removed from the walls thereof and adapted for slight end movement; and two parallel yielding flat strips at right angles thereto extending across the opposite ends of said pockets removed from the walls thereof and adapted for slight end movement.

5. In a device of the class described, the combination with a tray having a plurality of rows of egg receiving pockets; two parallel yielding flat strips extending across one end of each row of pockets removed from the walls thereof and adapted for slight end movement; and two parallel yielding flat strips at right angles thereto extending across the opposite ends of said pockets removed from the walls thereof and adapted for slight end movement, the outer edges of both sets of strips lying within the outer edges of the walls of said pockets.

6. In a device of the class described, the combination of a plurality of interlocked partitions at right angles to each other forming a collapsible tray; a pair of yielding parallel flat strips interposed between adjacent partitions and adapted to position the larger end of eggs placed between said interlocked partitions; and a pair of similar yielding flat strips at right angles to the first mentioned strips and adapted to position the smaller end of said eggs.

7. In a device of the class described, the combination of a plurality of interlocked partitions at right angles to each other forming a collapsible tray; a pair of yielding parallel flat strips interposed between adjacent partitions and adapted to position the larger end of eggs placed between said interlocked partitions; and a pair of similar yielding flat strips at right angles to the first mentioned strips.

8. In a device of the class described, the combination with a tray having a plurality of egg receiving pockets; a pair of separated yielding flat strips extending across one end of each pocket removed from the walls thereof, and a pair of similar flat strips at right angles thereto extending through the opposite end of each pocket less separated than those at the other end.

9. In a device of the class described, the combination of a plurality of parallel members having a plurality of slots in the upper edge thereof in groups of three; a second set of members at right angles thereto and interlocked therewith in the central slot of each group, each provided with two slots in the lower edge thereof intermediate said parallel members; a plurality of narrow strips in the other slots of said parallel members; and a plurality of narrow strips in the slots of the other set of members.

10. In a device of the class described, the combination of a plurality of parallel members having a plurality of slots in the upper edge thereof in groups of three; a second set of members at right angles thereto and interlocked therewith in the central slot of each group, each provided with two inclined slots in the lower edge thereof intermediate said parallel members; a plurality of narrow strips in the other slots of said parallel members; and a plurality of narrow strips in said inclined slots.

11. In a device of the class described, the combination of a plurality of parallel members having a plurality of slots in the upper part thereof in groups of three; a second set of members at right angles thereto and interlocked therewith in the central slot of each group, each provided with two slots in the lower part thereof intermediate said parallel members; a plurality of narrow flat strips in the other slots of said parallel members; and a plurality of narrow flat strips in the slots of the other set of members.

12. In a device of the class described, the combination of a tray having a plurality of egg receiving pockets, each wall of each pocket being provided with two slits; and flat strips movable endwise in said slits and adapted to yield laterally.

13. In a device of the class described, the combination of a tray having a plurality of egg receiving pockets, each wall of each pocket being provided with two slits, one set of parallel walls having its slits in the upper part thereof while the walls perpendicular to said parallel walls have their slits in the lower part thereof; and flat strips movable endwise in said slits and adapted to yield laterally.

Signed by me at 4 P. O. Sq., Boston, Mass., this ninth day of January, 1913.

JOHN B. WARREN.

Witnesses:
WALTER E. LOMBARD,
NATHAN C. LOMBARD.